United States Patent
Rosenman et al.

(10) Patent No.: US 7,287,190 B2
(45) Date of Patent: Oct. 23, 2007

(54) SIMULTANEOUS EXECUTION OF TEST SUITES ON DIFFERENT PLATFORMS

(75) Inventors: Victor Rosenman, Tel-Aviv (IL); Olga Kuturianu, Bat Yam (IL)

(73) Assignee: Sun Microsystems, Inc., Santa Clara, CA (US)

( * ) Notice: Subject to any disclaimer, the term of this patent is extended or adjusted under 35 U.S.C. 154(b) by 542 days.

(21) Appl. No.: 10/767,846

(22) Filed: Jan. 29, 2004

(65) Prior Publication Data

US 2005/0188262 A1    Aug. 25, 2005

(51) Int. Cl.
*G06F 11/00*    (2006.01)
(52) U.S. Cl. .............. 714/32; 714/25; 714/38
(58) Field of Classification Search .......... 714/32
See application file for complete search history.

(56) References Cited

U.S. PATENT DOCUMENTS

| | | | |
|---|---|---|---|
| 5,922,079 A | 7/1999 | Booth et al. | |
| 6,002,868 A | 12/1999 | Jenkins et al. | |
| 6,023,773 A * | 2/2000 | O'Donnell et al. | 714/40 |
| 6,167,352 A | 12/2000 | Kanevsky et al. | |
| 6,219,829 B1 | 4/2001 | Sivakumar et al. | |
| 6,311,149 B1 | 10/2001 | Ryan et al. | |
| 6,378,088 B1 | 4/2002 | Mongan | |
| 6,385,741 B1 | 5/2002 | Nakamura | |
| 6,393,591 B1 | 5/2002 | Edmondson et al. | |
| 6,397,378 B1 | 5/2002 | Grey et al. | |
| 6,449,731 B1 | 9/2002 | Frey, Jr. | |
| 6,560,721 B1 | 5/2003 | Boardman et al. | |
| 6,604,209 B1 * | 8/2003 | Grucci et al. | 714/38 |
| 6,708,324 B1 | 3/2004 | Solloway et al. | |
| 6,839,647 B2 | 1/2005 | Volkov et al. | |
| 6,847,916 B1 | 1/2005 | Ying | |
| 6,868,508 B2 | 3/2005 | Grey | |
| 6,980,916 B1 * | 12/2005 | Katz et al. | 702/119 |
| 6,983,400 B2 * | 1/2006 | Volkov | 714/38 |
| 2001/0053961 A1 | 12/2001 | Liu et al. | |
| 2001/0054161 A1 | 12/2001 | Wooddruff | |
| 2002/0133749 A1 | 9/2002 | Petersen et al. | |
| 2003/0131285 A1 * | 7/2003 | Beardsley et al. | 714/38 |
| 2004/0153774 A1 * | 8/2004 | Gavish et al. | 714/25 |
| 2004/0243381 A1 * | 12/2004 | Kuturianu et al. | 703/22 |
| 2005/0172268 A1 * | 8/2005 | Kuturianu et al. | 717/124 |
| 2006/0129892 A1 * | 6/2006 | Diaconu et al. | 714/38 |

OTHER PUBLICATIONS

Testharness for use in a distributed environment, IBM technical Disclosure Bulletin, Dec. 1999, UK, issue No. 428, p. No. 1728, published Dec. 1, 1999.*

(Continued)

*Primary Examiner*—Scott Baderman
*Assistant Examiner*—Joshua Lohn
(74) *Attorney, Agent, or Firm*—Meyertons Hood Kivlin Kowert & Goetzel, P.C.

(57) ABSTRACT

In an arrangement for testing multiple low-end computing devices simultaneously, different tests are executed simultaneously on different platforms using a single instance of a test harness to which multiple devices are connected. A platform-specific API is provided for independent components of the tests and platform-specific components are implemented for each test according to the respective platform-specific API. At run-time the test harness deploys each test together with a platform-specific execution agent, configured according to the components of the test. The agents execute the test suites, and return test results to the test harness.

20 Claims, 4 Drawing Sheets

OTHER PUBLICATIONS

Testcase script generator, IBM technical Disclosure Bulletin, Jul. 2001, UK, issue No. 447, p. No. 1220, published Jul. 1, 2001.*
Safari Books Online—http://proquest.safaribooksonline.com/print?xmlid=059600253x/j2meanut-chp-9.sect-1, Mar. 2002.*
U.S. Appl. No. 10/767,850, filed Jan. 29, 2004.
U.S. Appl. No. 10/767,849, filed Jan. 29, 2004.
U.S. Appl. No. 10/767,845, filed Jan. 29, 2004.
U.S. Appl. No. 10/767,851, filed Jan. 29, 2004.
U.S. Appl. No. 10/767,848, filed Jan. 29, 2004.

* cited by examiner

SIMULTANEOUS EXECUTION OF TEST SUITES ON DIFFERENT PLATFORMS

CROSS-REFERENCE TO RELATED APPLICATIONS

This Application relates to Application No. (STC File No. 47900), entitled "Automated Test Execution Framework with Central Management", and to Application No. (STC File No. 47979), entitled "Parallel Text Execution on Low-End Emulators and Devices".

BACKGROUND OF THE INVENTION

1. Field of the Invention

This invention relates to improvements in software and hardware design verification. More particularly, this invention relates to methods and systems for centrally managing the composition and execution of test suites for verification of different hardware and software.

2. Description of the Related Art

The meanings of acronyms and certain terminology used herein are given in Table 1:

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| HTTP | HyperText Transfer Protocol |
| ID | Identifier |
| IP | Internet Protocol |
| J2EE | Java 2 Enterprise Edition |
| J2ME | Java 2 Micro Edition |
| J2SE | Java 2 Standard Edition |
| JAD | Java application descriptor |
| JAR | Java archive |
| JDTS | Java Device Test Suite execution framework |
| MIDlet | A MIDP application |
| MIDP | Mobile information device profile. A set of Java APIs, which, together with the CLDC, provides a complete J2ME application runtime environment targeted at mobile information devices. |
| Platform | An underlying system on which application programs can run on a computing device. It typically includes an operating system, and can include supporting hardware, which may be either standardized, or customized for a particular computing device. |

MIDP is defined in Mobile Information Device Profile (JSR-37), JCP Specification, Java 2 Platform, Micro Edition, Ver 1.0a (Sun Microsystems Inc., Palo Alto, Calif., December 2000). MIDP builds on the Connected Limited Device Configuration (CLDC) of the Java 2 Platform, Micro Edition (J2ME) (available from Sun Microsystems Inc., Palo Alto, Calif.). The terms Sun, Sun Microsystems, Java, J2EE, J2ME, J2SE, and the Sun logo are trademarks or registered trademarks of Sun Microsystems, Inc. in the United States of America and other countries. All other company and product names may be trademarks of their respective companies. A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether tests have been passed or failed, and, in some cases may even indicate a module that is estimated to be faulty.

Conventionally, to test a device under development (such as a mobile information device), or to test software designed to run on such a device, a developer connects the device to an appropriate test system. The target device under test may be connected to the test system either directly or via a communication emulator. The developer selects a battery of test programs to run on the target device while monitoring its behavior. Running the complete battery of tests can commonly take many hours or even days. This problem is particularly acute in testing low-end computing devices, such as cellular telephones and other mobile information devices, which have limited computing power and memory resources. Thus, testing on the target device can become a serious bottleneck in the development cycle.

SUMMARY OF THE INVENTION

A centralized system for centrally managing test suites is disclosed in commonly assigned Application No. (STC File No. 47900), entitled "Automated Test Execution Framework with Central Management", which is herein incorporated by reference. In this arrangement, a central repository contains a management unit, available test suites and a single test execution framework, referred to herein as a test harness. Using the management unit, a system administrator establishes active versions of the various test suites and their individual configurations. End users install clients of the central repository, using a system-provided installer program. In each client, an execution script is created, which downloads the test harness and a local configuration file. Then, when the test harness is executed at the client, it loads with all designated test suites already installed, configured and ready for execution. The client always has the most current versions of all test suites. Advantageously, all necessary information is obtained from a single central location.

A further improvement in test suite management is disclosed in commonly assigned Application No. (STC File No. 47979), entitled "Parallel Text Execution on Low-End Emulators and Devices", which is herein incorporated by reference. While this arrangement facilitates testing large numbers of devices simultaneously, it does not address the problem of simultaneously testing software that is designed to execute on different platforms. Nor does it address the related problem of simultaneously applying test suites to different computing devices, which employ different platforms. In order to avoid replication of test suite development, test suites may be designed to execute on different platforms. However, each platform typically provides a unique environment. Furthermore, the different platforms may require the use of different communication protocols and API's. Therefore, it would be desirable if test suites could be simultaneously executed on different platforms using a common test harness.

Embodiments of the present invention provide methods and systems for parallel testing of multiple low-end computing devices (devices-under-test), such as mobile information devices in which different test suites are executed simultaneously on different platforms from a single instance of a test harness. The test harness has a component-based architecture. This is exploited according to the instant invention by the substitution of various software components that support a test suite in order to execute the test suite on a new platform or on a new computing device. For example, a platform-specific API is provided for each of the platforms upon which the test suite is executed on the clients of the test harness, that is by the devices-under-test. Other platform-specific software components needed to support execution of tests, e.g., an execution agent, and subsidiary classes, are implemented for each test suite according to the requirements of its respective platform-specific API. At runtime, the test harness deploys each test suite together with a compatible platform-specific execution agent and other platform-specific components. The agents execute the test suites, and communicate with the test harness, returning test results according to a known API.

The invention provides a method for testing computing devices, which is carried out by providing a plurality of suites of test programs for access by a server, wherein a first suite and a second suite of the plurality of suites are respectively adapted to run on a first platform and a second platform. The method further includes storing a first execution agent that is adapted to run on the first platform and a second execution agent that is adapted to run on the second platform for access by the server, and coupling a first computing device and a second computing device of the computing devices to the server, wherein the first computing device is adapted to operate using the first platform and the second computing device is adapted to operate using the second platform. The method further includes installing no more than one test harness on the server to support execution of the test programs by the first computing device and the second computing device, using the test harness to package a first test object with the first execution agent for download to the first computing device in a first package and to package a second test object with the second execution agent for download to the second computing device in a second package. The method further includes steps of responsively to an instruction of the test harness, downloading the first package and the second package to the first computing device and the second computing device, respectively, and con-currently executing a test program of the first package in the first computing device and a test program of the second package in the second computing device.

According to an aspect of the method, the first suite and the second suite comprise platform-specific JAR files.

According to yet another aspect of the method, the first package and the first package comprise JAR files.

A further aspect of the method is carried out by displaying the suites as a hierarchy of identifiers of test objects corresponding to the test programs, and selecting the first test object from the first suite for execution thereof by the first computing device, and selecting the second test object from the second suite for execution thereof by the second computing device.

The invention provides a computer software product, including a computer-readable medium in which computer program instructions are stored, which instructions, when read by a computer, cause the computer to perform a method for testing computing devices, which is carried out by providing a plurality of suites of test programs for access by a server, wherein a first suite and a second suite of the plurality of suites are respectively adapted to run on a first platform and a second platform. The method further includes storing a first execution agent that is adapted to run on the first platform and a second execution agent that is adapted to run on the second platform for access by the server, and coupling a first computing device and a second computing device of the computing devices to the server, wherein the first computing device is adapted to operate using the first platform and the second computing device is adapted to operate using the second platform. The method further includes installing no more than one test harness on the server to support execution of the test programs by the first computing device and the second computing device, using the test harness to package a first test object with the first execution agent for download to the first computing device in a first package and to package a second test object with the second execution agent for download to the second computing device in a second package. The method further includes steps of responsively to an instruction of the test harness, downloading the first package and the second package to the first computing device and the second computing device, respectively, and concurrently executing a test program of the first package in the first computing device and a test program of the second package in the second computing device.

The invention provides a system for testing computing devices, including a communication interface for coupling a plurality of the computing devices thereto for use in communicating with the system via the communication interface, a memory, a single test harness object stored in the memory, a suite of test programs stored in the memory for execution by the computing devices that are coupled to the system, and a processor that accesses the suite and the test harness object, wherein the processor cooperates with the test harness object to download the test programs via the communication interface for execution by the computing devices coupled thereto, so that at least first and second computing devices among the plurality execute different first and second test programs from the suite. The system provides facilities to receive messages via the communication interface from the computing devices with respect to execution of the test programs, and to control the execution of the test programs in the suite based on the messages by communicating responses to the messages via the communication interface, and wherein the first and second test programs are adapted to respective first and second platforms, and the first and second computing devices operate using the first and second platforms, respectively.

According to an aspect of the system, the first and second test programs are executed substantially simultaneously under control of the processor.

Still another aspect of the system the test harness object and the processor further cooperate to access first and second execution agents that are adapted to the first and second platforms, respectively, and to package the first and second test programs with the first and second execution agents, respectively, for download to the first and second computing devices.

Another aspect of the system includes a graphical user interface in the processor for displaying the test programs as a hierarchy for selection of the first and second test programs therefrom.

According to one aspect of the system, the computing devices are coupled to the communication interface via a common test host.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

System Overview.

Figure 1:
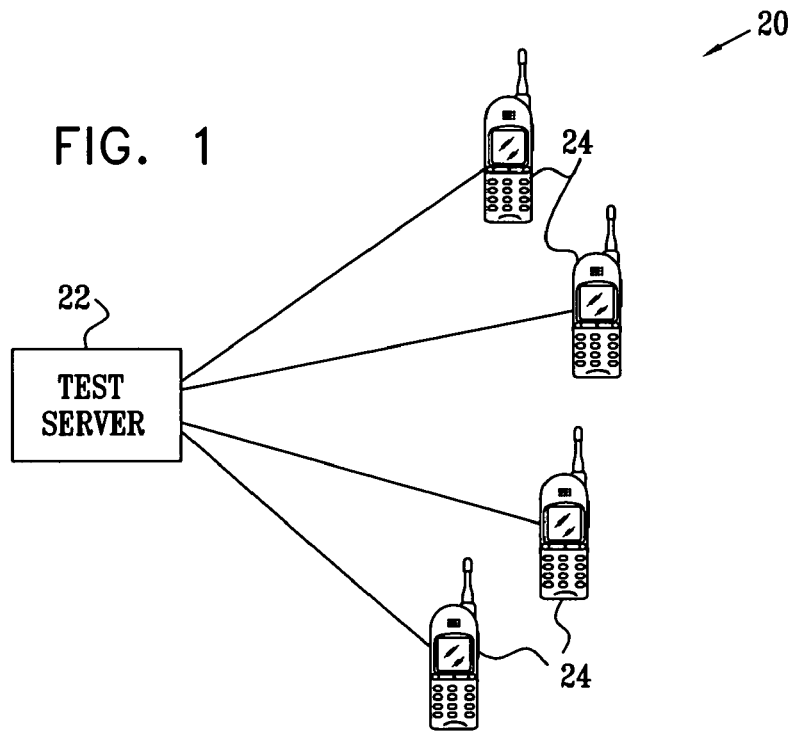
FIG. 1 is a block diagram that schematically illustrate systems for parallel testing of low-end computing devices, in accordance with an embodiment of the present invention.

Reference is now made to FIG. 1, which is a block diagram that schematically illustrates a system 20 for parallel testing of multiple mobile information devices 24, in accordance with an embodiment of the present invention. The system 20 is built around a test server 22, which is described in greater detail hereinbelow. The devices 24 are client devices, and are typically low-end devices, with limited computing power and memory, for example, cellular telephones or personal digital assistants (PDA's). In the description that follows, the devices 24 are assumed to comply with MIDP, but the principles of the present invention are equally applicable to other types of low-end computing devices, operating in accordance with other standards and specifications. The server 22 typically comprises a programmable processor, and has suitable memory and communication interfaces, such as wireless or wired interfaces, for communicating with multiple devices 24 simultaneously.

Each of the devices 24 typically receives a unique identifier for communicating with the server 22, which can be assigned in accordance with the methods disclosed in the above-noted Application No. (STC File No. 47979).

Figure 2:
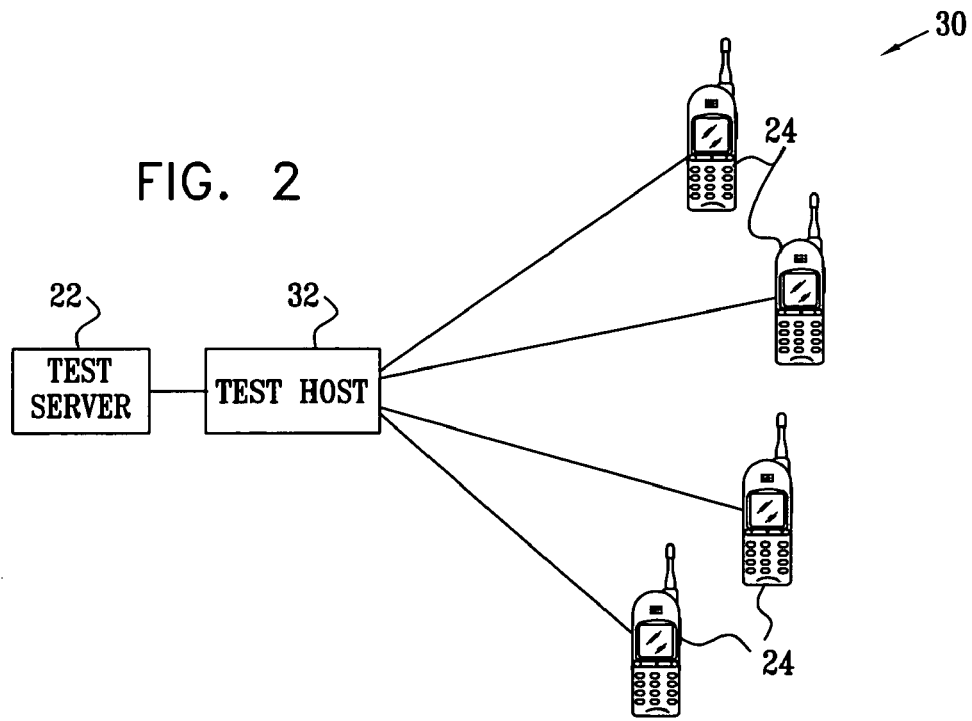
FIG. 2 is a block diagram that schematically illustrate systems for parallel testing of low-end computing devices, in accordance with an alternate embodiment of the present invention.

Reference is now made to FIG. 2, which is a block diagram that schematically illustrates a system 30 for parallel testing of multiple devices 24, in accordance with another embodiment of the present invention. In this embodiment, the server 22 communicates with the devices 24 through a test host 32, such as a personal computer or workstation. Multiple test hosts of this sort may be connected to the server 22 in parallel, but only a single host is shown in FIG. 2 for the sake of simplicity. The host 32 can simultaneously accommodate multiple devices 24.

Figure 3:
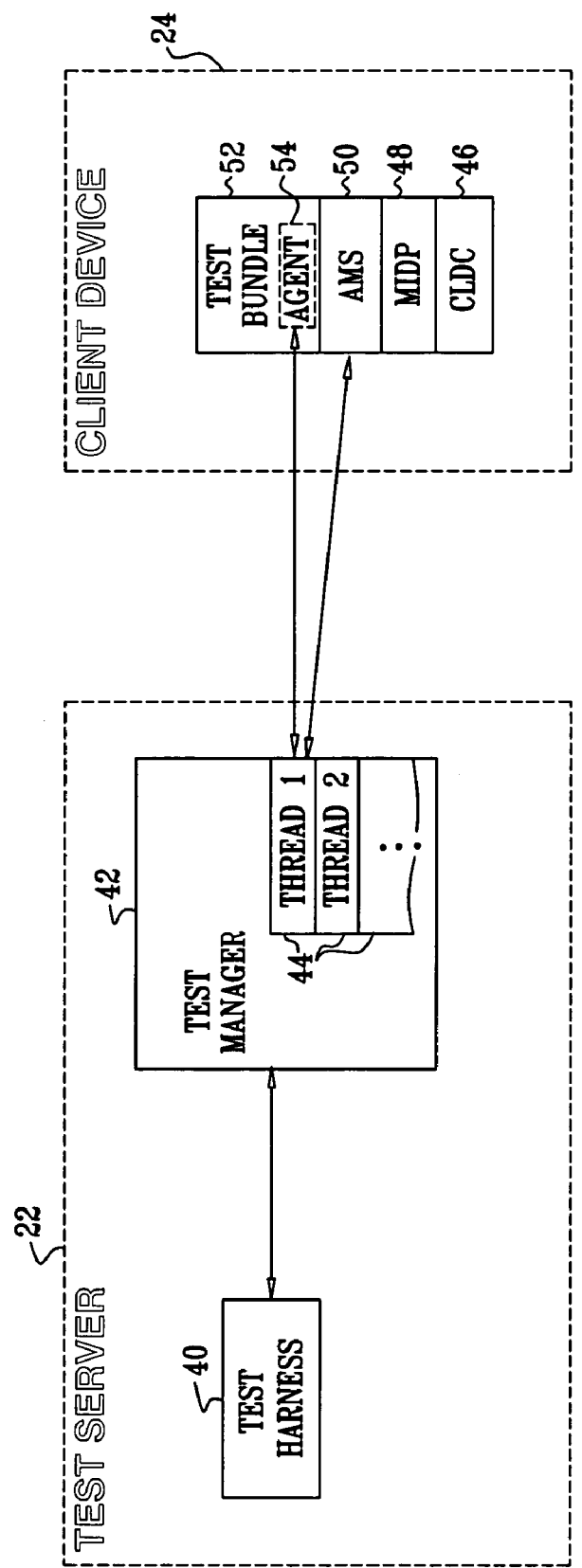
FIG. 3 is a block diagram that schematically illustrates program components used in a test system, in accordance with an embodiment of the present invention.

Reference is now made to FIG. 3, which is a block diagram that schematically illustrates software program components running on the server 22 and the devices 24, in accordance with an embodiment of the present invention. Elements of this software may be provided to the server 22 and to the devices 24 on tangible media, such as optical or magnetic storage media or semiconductor memory chips. The software may be downloaded to the server 22, and alternatively or additionally, to the devices 24 in electronic form, for example, over a network or over the air.

The server 22 comprises a test harness 40, which generates and deploys the tests to be carried out by the devices 24. The test harness 40 is realized as one or more objects stored in the memory of the server 22. The test harness 40 may be implemented as a modification of the "Java Device Test Suite" execution framework (JDTS) (version 1.0 or higher), available from Sun Microsystems, Inc., which employs MIDP. The test harness described in the above-noted Application No. (STC File No. 47900) can be modified for use as the test harness 40 by the application of ordinary skill.

A test manager 42 in the server 22 is responsible for serving requests from the devices 24, based on the unique client identifiers mentioned above. Typically, whenever one of the devices 24 makes a request, the test manager 42, typically operating as a main thread, reads the request and assigns a new thread 44 to handle it. This thread 44 retrieves the client unique identifier from the request, calls the components of the test harness 40 that are needed to process the request, and then returns the appropriate response to the client device, as described hereinbelow. After assigning the thread 44 to handle the client, the main thread of the test manager 42 waits for the next client request. Each client request is handled by a separate thread 44, which terminates upon completion of processing. This arrangement, together with the unique identifier mechanism, ensures that the server 22 is able to handle multiple devices 24 simultaneously without confusion.

In order to run Java applications, the devices 24 contain an implementation of the Connected Limited Device Configuration specification, CLDC 46, with an implementation of the Mobile Information Device Profile specification, MIDP 48, running over the CLDC 46. The applications that run on this technology, such as the tests supplied by test harness 40, are known as MIDlets. These applications are created by extending an API MIDlet class of the MIDP 48. Thus, each test bundle 52 is actually a MIDlet, packaged in the form of a JAD/JAR file pair. At least a portion of the test bundle 52 is typically downloaded to the devices 24 in a two-step process:

1. The server 22 downloads the JAD file, which contains environment settings and some environment demands. Application Manager Software, AMS 50, which is typically a part of a browser built into the devices 24, evaluates the JAD file to ensure that the device is able to accept the MIDlet. For example, the JAD file for a given MIDlet may specify that the device must support MIDP version 2.0. If the device does not support this version, the AMS 50 will reject the application download, and will save the time that would otherwise be consumed by downloading the much larger JAR file.

2. After completing all the relevant checks, the AMS 50 reads from the JAD file the location of the corresponding JAR file on the server 22 and asks to download the JAR file to one or more of the devices 24. The JAR file contains all the relevant classes of the test bundle 52.

Once the JAR file for the relevant portion of the test bundle 52 is downloaded to one of the devices 24 and stored in the local device memory, the device is ready to run the tests of the test bundle 52. Every JAR file that the AMS 50 downloads to the devices 24 typically contains an agent 54, which is used to run the tests, in addition to classes corresponding to the tests themselves. To start test execution the AMS 50 runs the agent class. The agent 54 then addresses the server 22 in order to receive instructions regarding the next test to run (getNextTest) and to report test results (sendTest-Result), typically using a protocol based on HTTP. Each test in the test bundle 52 corresponds to a respective class in the JAR file. Each client request that is addressed by the agent 54 to the server 22 includes the unique identifier that has been assigned to the particular one of the devices 24, so that the server 22 is able to recognize the client and serve it in the correct manner. Further details of the implementation of the server 22 are given in the above-noted Application No. (STC File No. 47979).

The test harness 40 has a component based architecture. An API is provided for independent components of the tests for each of the platforms upon which the test bundle 52 is executed at the devices 24. At the test harness 40, platform-specific components are implemented for each test bundle 52 according to the respective platform-specific API. At runtime, the test harness 40 deploys each test bundle 52 together with the agent 54, which is platform-specific, and configured according to the components of the particular test bundle 52. In each of the devices 24, the agent 54 executes the test bundle 52, and communicates with the test harness 40, returning test results according to a common API.

Test Suite Selection.

Figure 4:
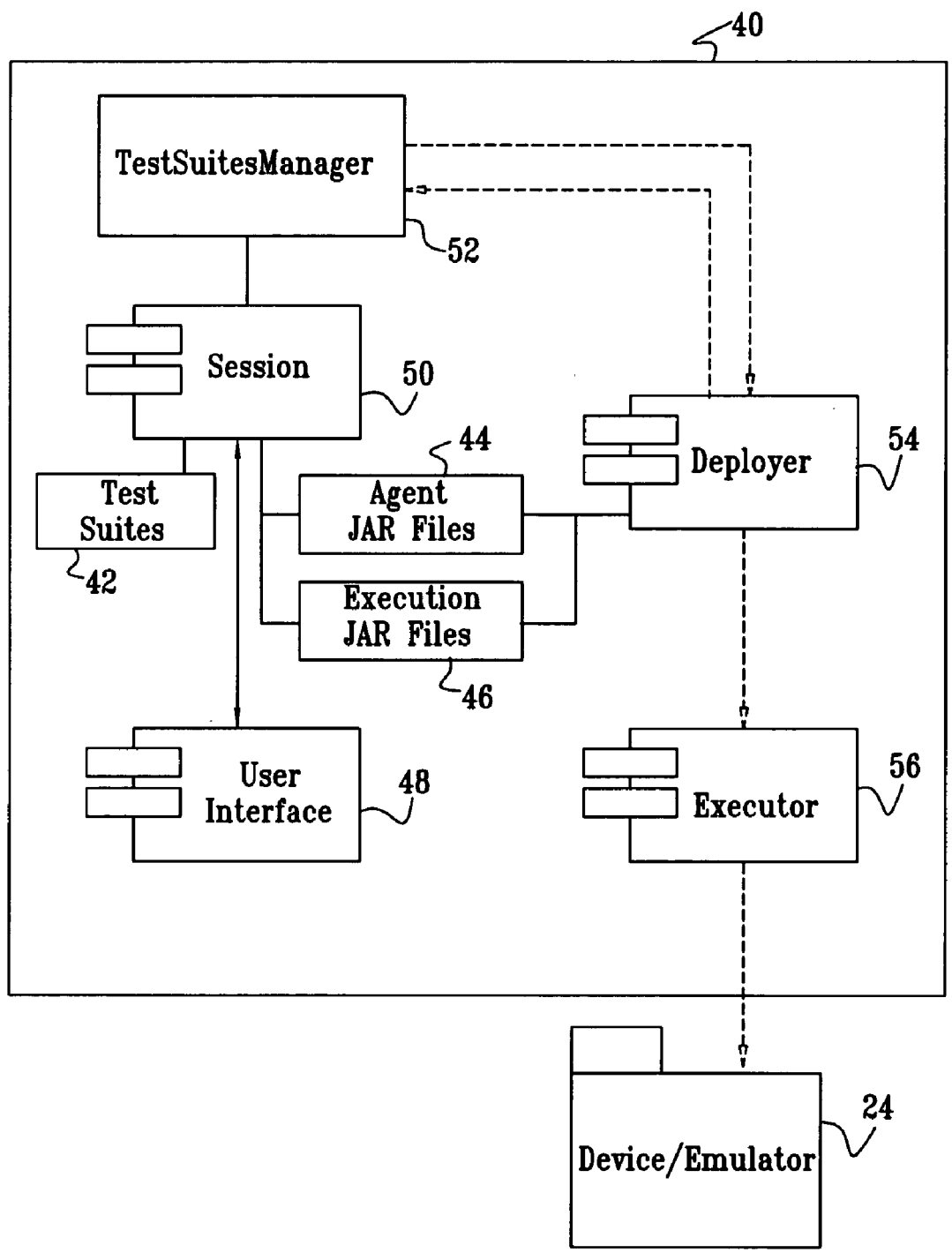
FIG. 4 is a detailed block diagram of aspects of the program components shown in FIG. 3, in accordance with an embodiment of the invention.

Reference is now made to FIG. 4, which is a detailed block diagram of the test harness 40 (FIG. 3) in accordance with a disclosed embodiment of the invention. Each of the available test suites 42 is associated with one of a group of execution agent JAR files 44 and one of a group of test API JAR files 46. The agent JAR files 44 and the API JAR files 46 are platform-specific. They are accessed by the test harness 40 when packaging tests for download. The tests typically are packaged in the form of Java applications contained in a set of JAD and JAR files. Each JAR file of this sort, together with its accompanying JAD file, is referred to hereinbelow as a test bundle 52. As explained in further detail hereinbelow, users of the system 20 (FIG. 1) or the system 30 (FIG. 2) interact with the test harness 40 in order to select the tests to be executed by the system. Alternatively, other test harnesses may be used for generating the required test files, as will be apparent to those skilled in the art.

The test harness 40 is provided with a user interface 48 that permits visualization of all available test suites and selection of tests of the test suites to be run. As is explained in further detail hereinbelow, the user interface 48 displays the test suites and the tests comprising the test suites as a hierarchy of test names or identifiers that reference test program objects.

Using a session component 50, which stores all the test suites, a tree is constructed by the test harness 40 that contains all the test suites, With the user interface 48 the tree is displayed for the user, who can choose any combination of tests from the display. The user selections are transmitted to the session component 50. The session component 50 relates to a test suites manager 52, which further interoperates with the test harness 40 as explained below.

Test Suite Deployment.

The test harness 40 includes a deployer 54, which receives tests from the test suites manager 52 that have been selected by the session component 50 from the test suites 42 for packaging into JAR files. In the deployer 54 each test is associated with one of test suites 42 that are held in the session component 50. The deployer 54 accesses the corresponding one of the agent JAR files 44 and the API JAR files 46 and creates a new JAR file that includes the test itself and its associated specific execution agent and test API. As noted above, one or more these new JAR files form a test bundle 52, which is downloaded to the devices 24 or to a separate test host, for example the test host 32 (FIG. 2). Alternatively, the download could be directed to an emulator (not shown) of the devices 24. An executor 56 initiates the download of the new JAR files to the devices 24.

A code fragment shown in Listing 1 presents further details of the current software implementation of the deployer 54. As explained above, the devices 24 are able to execute the tests as they employ the agent classes of the particular test bundle 52, which are specific to the test suite and compatible with the different platforms being used by the devices 24.

Figure 5:
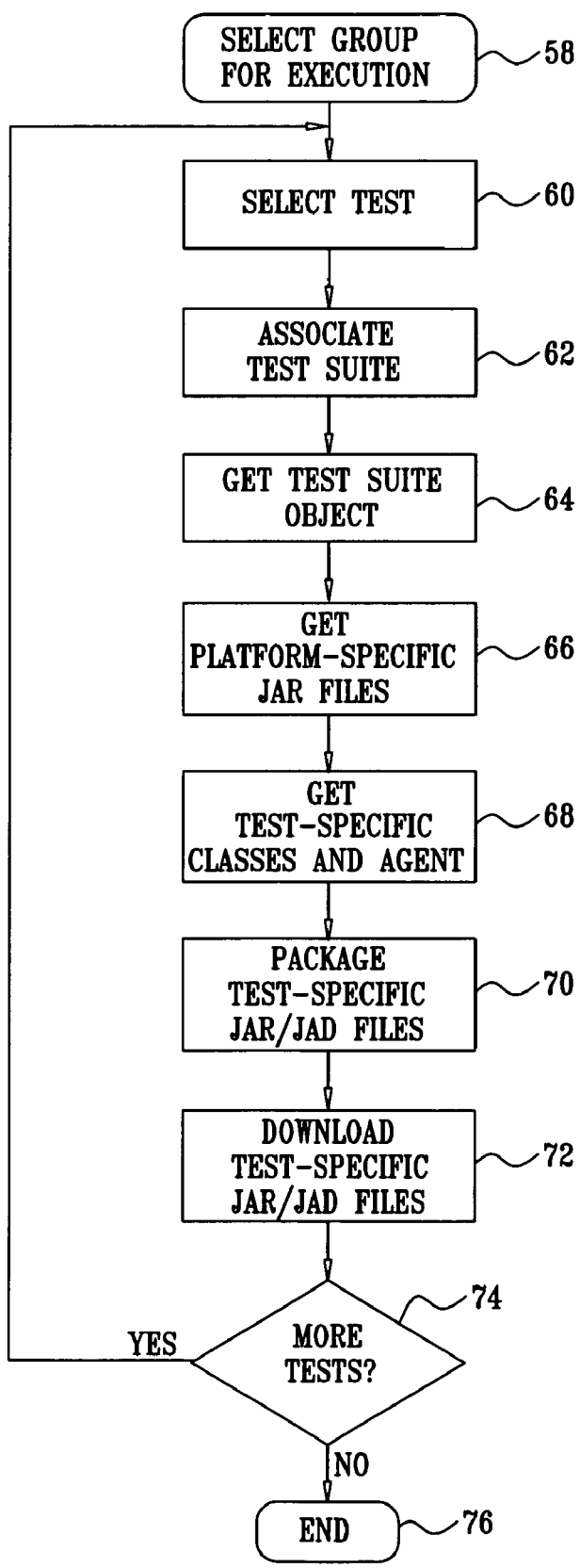
FIG. 5 is a flow chart illustrating a method for executing tests on a device that is attached to a test harness, in accordance with an embodiment of the invention.

Reference is now made to FIG. 5, which is a flow chart illustrating a method for executing tests on a device that is attached to a test harness in accordance with a disclosed embodiment of the invention. Only one device is illustrated for clarity of presentation, but it will be understood that different devices, operating on different platforms, can execute tests concurrently. The process steps are shown in a particular sequence in FIG. 5. However, it will be evident to those skilled in the art that many of them can be performed in parallel, asynchronously, or in different orders.

The process begins at initial step 58. Here a group of tests is selected for execution on a device-under-test. The device-under-test is connected to a test harness.

Next, at step 60, a current test from the group defined in initial step 58 is chosen.

Next, at step 62 a pre-defined test suite that includes the current test chosen at step 60 is associated with the current test.

Next, at step 64 an object is retrieved from a store corresponding to the test suite identified at step 62.

Next, at step 66 JAR files are extracted from the object that was retrieved in step 64. The JAR files are specific to the platform of the device-under-test.

Next, at step 68 classes required to operate the current test are extracted from the JAR files that were obtained in step 66. These classes include an execution agent, corresponding to the agent 54 (FIG. 3).

Next, at step 70 a new JAR file and an accompanying JAD file are packaged. The JAR file includes the classes extracted at step 68, including the execution agent.

Next, at step 72, the new JAD and JAR files that were prepared in step 70 are downloaded to the device-under-test for execution.

Control now proceeds to decision step 74, where it is determined if more tests remain to be processed. If the determination at decision step 74 is affirmative, then control returns to step 60.

If the determination at decision step 74 is negative, then control proceeds to final step 76 and the process terminates. However, the process may be immediately repeated so long as there are additional devices available for connection to the test harness. Such devices may operate on the same or on different platform as the first device. Thus, using the method illustrated in FIG. 5, any number of different devices may execute tests simultaneously, on different platforms, using only a single test harness.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for testing computing devices, the method comprising:
   providing a plurality of suites of test programs for access by a server, wherein a first suite and a second suite of said plurality of suites are respectively adapted to run on a first platform and a second platform;
   storing a first execution agent that is adapted to run on said first platform and a second execution agent that is adapted to run on said second platform for access by said server;
   providing a test harness on said server to support execution of said test programs by at least a first computing device and a second computing device, wherein said first and second computing devices are coupled to said server, and wherein said first computing device is adapted to operate using said first platform and said second computing device is adapted to operate using said second platform;
   using said test harness, packaging a first test object with said first execution agent for download to said first computing device in a first package and packaging a second test object with said second execution agent for download to said second computing device in a second package;
   responsively to an instruction of said test harness, downloading said first package and said second package to said first computing device and said second computing device, respectively; and
   concurrently executing a test program of said first package in said first computing device and a test program of said second package in said second computing device.

2. The method according to claim 1, wherein said first suite and said second suite comprise platform-specific JAR files.

3. The method according to claim 1, wherein said first package and said second package comprise JAR files.

4. The method according to claim 1, further comprising:
   displaying said suites as a hierarchy of identifiers of test objects corresponding to said test programs; and
   responsively to said step of displaying said suites, selecting said first test object from said first suite for execution thereof by said first computing device, and selecting said second test object from said second suite for execution thereof by said second computing device.

5. The method according to claim 1, further comprising receiving requests at said server from said computing devices requesting said server to provide test programs to the computing devices.

6. The method according to claim 1, further comprising:
   receiving requests at said server from said computing devices requesting said server to provide test programs to the computing devices; and
   in response to receiving a request, assigning a thread to process the request;
   wherein each received request is assigned a separate thread to allow concurrent execution of the test programs in said computing devices.

7. The method according to claim 6, further comprising each thread assigned to process a received request retrieving a unique identifier from the request that identifies a requesting computing device, calling components of the test harness that are used to process the request, and returning a response to the requesting computing device.

8. The method according to claim 1, further comprising:
   receiving messages from said computing devices with respect to execution of said test programs; and
   controlling said execution of said test programs in said suite based on said messages by communicating responses to said messages to said computing devices.

9. The method according to claim 1, further comprising:
   selecting a test program for execution in one of the computing devices, wherein the computing device is adapted to operate using a particular platform;
   retrieving an object corresponding to a test suite that includes the selected test program;
   extracting JAR files that are specific to the platform of the computing device from the object;
   extracting classes and an execution agent from the JAR files;
   packaging the extracted classes and execution agent in a first package for download to the computing device; and
   downloading the first package to the computing device for execution.

10. The method according to claim 1, further comprising:
    receiving a request from one of the computing devices at said server requesting a next test program to execute at the computing device, wherein the request includes a unique identifier corresponding to the requesting computing device; and
    determining a next test program to be executed by the requesting device.

11. A computer software product, comprising a computer-readable storage medium in which computer program instructions are stored, which instructions, when read by a computer, cause the computer to perform a method for testing computing devices, the method comprising:
    providing a plurality of suites of test programs for access by a server, wherein a first suite and a second suite of said plurality of suites are respectively adapted to run on a first platform and a second platform;
    storing a first execution agent that is adapted to run on said first platform and a second execution agent that is adapted to run on said second platform for access by said server;
    providing a test harness on said server to support execution of said test programs by at least a first computing device and a second computing device, wherein said first and second computing devices are coupled to said server, and wherein said first computing device is adapted to operate using said first platform and said second computing device is adapted to operate using said second platform;

using said test harness, packaging a first test object with said first execution agent for download to said first computing device in a first package and packaging a second test object with said second execution agent for download to said second computing device in a second package;

responsively to an instruction of said test harness, downloading said first package and said second package to said first computing device and said second computing device, respectively; and initiating concurrent execution of a test program of said first package in said first computing device and a test program of said second package in said second computing device.

12. The computer software product according to claim 11, wherein said first suite and said second suite comprise platform-specific JAR files.

13. The computer software product according to claim 11, wherein said first package and said second package comprise JAR files.

14. The computer software product according to claim 11, wherein said method for testing computing devices further comprises:

displaying said suites as a hierarchy of identifiers of test objects corresponding to said test programs for selection of said first test object from said first suite for execution thereof by said first computing device, and said second test object from said second suite for execution thereof by said second computing device.

15. A system for testing computing devices, comprising:
a communication interface for coupling at least a first computing device and a second computing device thereto for use in communicating with said system, wherein said first computing device is adapted to operate using a first platform and said second computing device is adapted to operate using a second platform;
a memory;
a test harness object stored in said memory;
a plurality of suites of test programs stored in said memory for execution by said computing devices that are coupled to said system, wherein a first suite and a second suite of said plurality of suites are respectively adapted to run on said first platform and said second platform;
a first execution agent and a second execution agent stored in said memory, wherein said first execution agent is adapted to run on said first platform and said second execution agent is adapted to run on said second platform;
a processor configured to access said suite and said test harness object, wherein said processor using said test harness is operable to:
package a first test object with said first execution agent for download to said first computing device in a first package and package a second test object with said second execution agent for download to said second computing device in a second package;
download said first package and said second package to said first computing device and said second computing device, respectively; and
initiate concurrent execution of a test program of said first package in said first computing device and a test program of said second package in said second computing device.

16. The system according to claim 15, wherein said first and second test programs are executed substantially simultaneously under control of said processor.

17. The system according to claim 15, wherein said processor using said test harness is further operable to receive messages via said communication interface from said computing devices with respect to execution of said test programs, and to control said execution of said test programs in said suite based on said messages by communicating responses to said messages via said communication interface.

18. The system according to claim 17, wherein said first and second packages comprise platform-specific JAR files.

19. The system according to claim 15, further comprising a graphical user interface in said processor for displaying said test programs as a hierarchy for selection of said first and second test programs therefrom.

20. The system according to claim 15, wherein said computing devices are coupled to said communication interface via a common test host.

* * * * *